United States Patent Office 3,734,807
Patented May 22, 1973

3,734,807
POLYVINYL FLUORIDE SURFACED LAMINATES
Peter Bernard Kelly, Cincinnati, Ohio, and Jay Thomas Oliver, Fort Mitchell, Ky., assignors to Formica Corporation, Cincinnati, Ohio
No Drawing. Continuation-in-part of abandoned application Ser. No. 780,183, Nov. 29, 1968. This application Mar. 29, 1971, Ser. No. 129,133
Int. Cl. B44c 1/26, 5/04; B32b 27/30
U.S. Cl. 161—5                                    6 Claims

ABSTRACT OF THE DISCLOSURE

A decorative laminate comprising a heat and pressure consolidated assembly of a rigidity imparting base member, a clear transparent film covering the surface of the decorative side of the laminate in which said clear, transparent film is a homogeneous blend of poly-vinyl fluoride containing uniformly dispersed therein from about 0.1% to about 10% by weight of a polymer derived from a monomer of a polymerizable 2-hydroxy-benzophenone containing a polymerizable ethylenically unsaturated group wherein said film is bonded to the remaining layers of the laminate through an alpha cellulose paper layer impregnated with from about 60% to about 70% by weight of a thermosetting melamine formaldehyde resin having a mol ratio between about 1:1.5 and 1:2.5 melamine to formaldehyde respectively.

CROSS-REFERENCE TO RELATED APPLICATION

This application is a continuation-in-part application of our parent application Ser. No. 780,183, filed Nov. 29, 1968, now abandoned.

BACKGROUND OF THE INVENTION

Decorative laminates have been produced commercially in the United States and other countries of the world for a substantial plurality of years. These decorative laminates contain a plurality of laminae that are heat and pressure consolidated together to form a unitary structure. The surface sheet is a decorative sheet which may be a solid color or may carry a decorative design thereon such as a wood-grain print, floral designs or geometric figures, and the like. The decorative sheet is impregnated as a preliminary step with a noble thermosetting resin. A noble resin is recognized in the industry as being one which does not undergo any significant color deterioration during the consolidation step. The thermosetting resin is converted to the thermoset state during the consolidation. The decorative sheet containing the noble thermosetting resin is then superimposed over one or more core sheets which are generally kraft paper sheets that have been impregnatd with a thermosetting phenolic resin. As before, the thermosetting phenolic resin is converted to the thermoset state during the consolidation step. The number of core sheets can be varied very substantially depending on the thickness of the laminate ultimately desired. When extremely thin laminates are desired, only one core sheet or possibly two core sheets are used. On the other hand, it is frequently desired to make laminates that are 1/32", 1/16" or 1/8" in thickness; or if desired, in even greater thicknesses. In order to get the thicker laminates, one simply increases the total number of core sheets to three, five, seven, nine or more. If desired and particularly when the decorative sheet is a printed design, one may superimpose over the decorative sheet an overlay sheet which is generally a fine quality alpha-cellulose paper sheet impregnated with a noble thermosetting resin preferably of the same class as that used to impregnate the decorative sheet; and after the heat and pressure consolidation step is completed the overlay sheet becomes transparentized so that the decorative sheet can readily be seen through the overlay sheet. These decorative laminates have found broad and extensive use particularly for surfacing indoor objects such as countertops, vanities, table tops, and the like. For outdoor surfaces these laminates undergo some significant deterioration after prolonged exposure to the elements. Many efforts have been made in an endeavor to surface a decorative laminate with a layer of some material that would be able to endure the exposure to the elements without undergoing any significant deterioration.

FIELD OF THE INVENTION

The present invention is in the field of decorative laminates designed to enhance significantly the endurance of said laminate to adverse weathering conditions without undergoing significant deterioration in which the laminate has a conventional structure such as the rigidity imparting base member but in which the laminate is surfaced with a clear, transparent, pigment-free film of a blend of polyvinyl fluoride and certain small quantities of a polymer of a certain polymerizable benzophenones.

DESCRIPTION OF THE PRIOR ART

The United States Pat. 3,340,137 discloses and claims a unitary, heat and pressure consolidated weather resistant decorative laminated article which is surfaced with a substantially transparent top film of adherable polyvinyl fluoride. The U.S. Pats. 2,937,157, 2,904,529, 2,947,723, 2,962,533, 3,173,893, 3,215,665, 3,313,866 and 3,365,421 show polymerizable ultraviolet absorbers and polymers thereof. All of these patents are incorporated herein by reference.

SUMMARY OF THE INVENTION

A decorative laminate comprising a heat and pressure consolidated assembly of a rigidity imparting base member, a film covering the surface of the decorative side of the laminate in which said film is a homogeneous blend of polyvinyl fluoride containing uniformly dispersed therein from about 0.1% to about 10% by weight of a polymer derived from a polymerizable benzophenone wherein said film is bonded to the remaining layers of the laminate through an alpha cellulose paper layer impregnated with from about 60% to about 70% by weight of a thermosetting melamine formaldehyde resin having a mol ratio between about 1:1.5 and 1:2.5 melamine to formaldehyde respectively.

In conventional decorative laminates as produced commercially for many years, manufacturers have traditionally impregnated the decorative sheet with a thermosetting melamine resin in which the amount of the resin present would be varied between about 40% and 50% by weight, said percentage by weight being based on the total weight of the paper and the resin. When the decorative sheet is a solid color, ordinarily no overlay sheet is used. When the decorative sheet is a print such as a floral design or a wood print, ordinarily an overlay sheet is superimposed on said decorative sheet and, after heat and pressure consolidation, the overlay sheet becomes a part of the unitary structure and acts as a protective barrier against abrasion of the print sheet. Regardless of whether the overlay sheet is used or not the decorative sheet has in the past conventionally contained about 40 to 50% of the melamine resin. When the overlay sheet is used with the decorative sheet, the overlay sheet is generally an alpha cellulose paper sheet which is impregnated with from about 60 to 70% of a thermosetting melamine resin. The alpha cellulose sheet thus impregnated becomes transparent during the laminating procedure due to the heat and pressure applied to the entire assembly wherein the thermosetting resins are converted to the thermoset state and the noble quality of the melamine resins permits the production of a clear transparent barrier layer over the print sheet.

Films of polyvinyl fluoride are recognized for their ability to withstand severe adverse weathering conditions and would be ideally suited for use as the surfacing layer of decorative laminates if it were not for the fact that polyvinyl fluoride, in film form, has a reputation of being a difficultly adherable material in that said polyvinyl fluoride films do not bond readily to substrates even when the film has been pretreated in order to give it an "adherable" characteristic unless specially designed resin adhesive systems are used such as those disclosed and claimed in the U.S. Pat. 3,340,137 referred to hereinabove. Even when one takes a film of polyvinyl fluoride that has been pretreated on one side so as to render it more "adherable" and one endeavors to use said treated film to bond to a decorative sheet impregnated with conventional amounts of melamine resin using conventional procedures, one finds that the polyvinyl fluoride film either fails to adhere to the decorative sheet or displays tendencies to de-laminate when exposed for even relatively short periods of time to adverse weather or accelerated weather conditions.

The instant invention, therefore, resides in the discovery that a clear, transparent, pigment-free modified film of polyvinyl fluoride, that is a film comprising a blend of polyvinyl fluoride with from about 0.1% and 10% by weight of a polymer derived from a polymerizable benzophenone, that said blended material in film form will bond securely and permanently to the uppermost paper sheet in a decorative laminate assembly, if the uppermost paper sheet is (1) an alpha cellulose paper sheet and if (2) said alpha cellulose paper sheet is impregnated with a thermosetting melamine formaldehyde resin having a resin content in the sheet within the range of about 60% to about 70% by weight based on the total weight of the impregnated alpha cellulose sheet. It is preferred to use between about 1% and 5% by weight of the polymer of the polymerizable benzophenone. The concept of the present invention is applicable to laminates in which the surface film is bonded directly to the alpha cellulose paper sheet which paper sheet is the decorative sheet either because it has been pigmented with a selected pigment so as to give it a solid color or in which the alpha cellulose sheet is printed with some suitable selected design. It is preferred, however, that the surface film of the polyvinyl fluoride composition be bonded to the decorative sheet by use of an "overlay sheet" which overlay sheet is also an alpha cellulose paper sheet which has been pre-impregnated with from about 60% to about 70% by weight of a thermosetting melamine formaldehyde resin. When the "overlay" sheet is used and becomes transparentized during the heat and pressure consolidation step, the decorative sheet, which is positioned immediately below the overlay sheet, is simply impregnated with conventional amounts of the thermosetting melamine formaldehyde resin, namely between about 40% and 50% by weight. When no overlay sheet is used and the modified polyvinyl fluoride film is bonded directly to the decorative sheet said decorative sheet must likewise be an alpha cellulose paper sheet and must contain between about 60% and 70% by weight of the thermosetting melamine formaldehyde resin. Beneath the decorative sheet, any of the conventional rigidity imparting base members may be used and preferably one would use one or more kraft paper core sheets impregnated with a thermosetting phenolic resin. The number of core sheets can be varied at will and depends upon the desired thickness of the ultimate laminate. During the heat and pressure consolidation step all of the thermosetting resins used to impregnate the various paper layers, namely the melamine-formaldehyde and the phenol-formaldehyde resins are converted to the thermoset state.

The polyvinyl fluoride film used in the laminate of the present invention must be clear, transparent and substantially pigment-free. These polyvinyl fluoride films are available commercially and can be obtained in a plurality of thicknesses such as those varying between about 0.5 and 4 mils. In addition, the polyvinyl fluoride film must be pre-treated to render at least one side thereof adherable. By "adherable" is meant any condition imposed on a surface of the film by various physical or chemical techniques to render the surface of the film susceptible to bonding with conventional substrates, among which are included cellulosic materials, e.g., wood, paper, fiberboard, and the like; metals, e.g., galvanized steel, aluminum, and the like; flexible plastics, felts, papers and the like: as well as conventional thermoplastics and thermosetting resinous surfaces.

Methods of manufacturing polyvinyl fluoride films useful in the present invention are well known in the art and therefore need not be described herein. One such method is that of U.S. Pat. 2,953,818, herein incorporated by reference. The various treatments used to render one or both surfaces of polyvinyl fluoride films adherable are also known in the art, e.g., Belgiant Pats. 610,318, 619,638 and 620,723.

Thus, in Belgian Pat. 619,638 there is described a method of making one side of a polyvinyl fluoride film adherable without affecting the non-adherability of the other side by passing the film around an electrically grounded rotating drum while the outer face is electrically charged by passage close to a D.C. electrode, causing the film to adhere strongly to the drum. The film is then passed, in close proximity by a set of tubular electrodes carrying an A.C. current. Nitrogen is passed through the tubular electrodes and into the space between the electrodes and the drum. The film is then conducted away from the grounded drum. Belgian Pat. 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details see the aforementioned Belgian patents which are herein incorporated by reference.

A convenient method for determining whether a surface of a polyvinyl fluoride film is adherable for the purposes of the present invention is to compare the behavior of an unknown film (X) to the behavior of a film (N) which is known to be non-adherable. Both films are cleaned with a cloth saturated with a solution of 30% by weight n-propyl alcohol in water. After allowing the film to dry, a drop of the same solution is squeezed from an eye dropper onto the surface of each film. If the film (X) is adherable, the drop will spread at a rate approximately twice as fast as that on film (N), i.e., the area covered by the drop on film (X) will be twice the area covered on film (N) over the same period of time. For example, after about 10–20 seconds from the time of application of the drop, if both films are non-adherable, the drops will spread at approximately the same rate in each application.

Substantially transparent polyvinyl flluoride films treated to impart adherability on one or both sides may be used. When a film with a single adherable side is employed, the adherable side will, of course, be the side which is bonded to the melamine resin impregnated sheet member.

The melamine formaldehyde resin used in the above stated amounts to impregnate that alpha cellulose paper sheet which, in the ultimate laminate produced, is in direct physical contact with the modified polyvinyl fluoride film. Whether the paper sheet is the decorative sheet or the overlay sheet, it must be impregnated with a melamine formaldehyde thermosetting resin having a mol ratio varying between about 1:1.5 and 1:2.5 and preferably 1:1.9 to 1:2.1 melamine to formaldehyde respectively. As will be shown hereinbelow, past experience has taught that laminate systems which will not withstand long periods in boiling water without blistering and without delamination of the laminate surface will generally perform poorly in actual outdoor service. Naturally boiling water is not the full equivalent to exterior exposure but it is a measure of the bondability of the film of the rest of the laminate and when this bondability is poor enough that blisters appear in the boiling water, delamination can occur on exterior exposure. The addition of the transparent surface sheet therefore is not just a minor improvement, but makes the difference between an acceptable and an unacceptable product on the basis of this test. Long term weather studies of these laminates under actual natural weather conditions have been undertaken, but it will take years before the actual dependability of the laminate for outdoor use will be known. However, the accelerated test in weatherometer machines and in the boiling water test referred to hereinabove gives a clear and reliable indication of the expected dependability of the laminate in actual outdoor weathering conditions. Polyvinyl fluoride films bonded to conventional melamine resin decorative laminates blister rapidly in boiling water and fail rapidly in exterior exposure. In the test method referred to hereinabove a laminate having the approximate dimensions 3 x 6 x 0.05 inches is immersed in a kettle of refluxing tap water. The water is changed once after 24 hours to minimize the effect of materials leached from the laminate. After periodic intervals (usually 24 hours) the sample is removed and visually examined. Any significant blistering or delamination is cause for rejection. Because of the possibility of small imperfections in the paper, gel particles in the resins, fingerprints on the film, etc., a few small isolated blisters are permitted. These must be less than 1/16" in diameter and must not exceed 3 in number per 9 square inches of laminate surface.

In order that the concept of the present invention may be more fully understood, the following examples are set forth.

EXAMPLE 1

Eight sheets of a thermosetting phenol-formaldehyde resin impregnated kraft paper are arranged in superimposed relationship. A decorative sheet of alpha cellulose paper impregnated with a thermosetting melamine formaldehyde resin in a content of about 40% by weight of the melamine formaldehyde resin is superimposed on the core sheets and an overlay sheet of alpha cellulose paper, 29 lbs. basis weight (3000 sq. ft. ream size), impregnated with 68% by weight of a thermosetting melamine-formaldehyde resin having a mol ratio of 1:2 respectively is superimposed on the decorative sheet. On the overlay sheet, there is positioned a commercially available one mil (.001") thick clear, transparent, substantially pigment-free polyvinyl fluoride film which contains about 5% of a homopolymer of 2-hydroxy-4-acryloxyethoxy benzophenone UV stabilizer; said film having been pre-treated so as to make it adherable on the side which contacts the overlay sheet and the entire assembly is inserted into a press and heat and pressure consolidated to a unitary structure using 1400 p.s.i. pressure and heating at 160° C. for 20 minutes and then cooling and removing from the press. The laminate was placed in boiling water and after 200 hours showed no deterioration, no blistering, cracking, crazing; and, in fact, no ill effects whatever.

EXAMPLE 2

Example 1 is repeated in all essential details except that a commercially available clear one mil (.001") thick polyvinyl fluoride was used. This film is the same chemical composition, i.e., blend of polymers, as used in Example 1 but differs in molecular orientation. The laminate thus produced passed a 100-hour boil test without any ill effects.

EXAMPLE 3

Example 1 is repeated in all essential details except that the translucent sheet was rayon paper impregnated with 68% by weight of a melamine formaldehyde resin having a mol ratio of 1:2 melamine to formaldehyde, respectively. The laminate thus produced passed a 100-hour water boil.

EXAMPLE 4

Example 1 is repeated in all essential details except that the press cycle was 1400 p.s.i. and the heating schedule was for 20 minutes to 130° C., six minutes to 135° C., 20 minutes between 135° C. and 142° C. and then cooled and removed from the press. This laminate withstood over 100 hours in boiling water with no blistering.

EXAMPLE 5

Example 1 was repeated in all details in a series except that 40%, 50%, 60%, 70% resin content were used in the overlay sheets. All laminates produced withstood boiling for 100 hours. But at 50% or below, in resin content, the clarity of the overlay sheet was deemed insufficient.

EXAMPLE 6

Example 1 was repeated in all details except that the alpha cellulose overlay sheet had a basis weight of 18 lbs. The laminate thus produced passed a 100 hour boil test without showing any ill effects.

EXAMPLE 7

Example 1 was repeated in all details except that the overlay sheet was impregnated with a melamine formaldehyde resin having a mol ratio of 1:2.5 respectively. The laminate thus produced passed a 100-hour boil test without showing any ill effects.

EXAMPLE 8

Example 1 was repeated in all details except that the overlay sheet was impregnated with a melamine formaldehyde resin having a mol ratio of 1:1.5 respectively. The laminate thus produced was marginal to passing the 100-hour boil test.

COMPARATIVE EXAMPLE 9

Example 1 is repeated in all essential details except that the alpha cellulose overlay sheet was omitted. The laminate thus produced upon being boiled in water for 24 hours blistered severely and delamination signs were in evidence.

COMPARATIVE EXAMPLE 10

Example 9 was repeated in all details in a series except that the resin contents of the print sheet were 48%, 53%, and 56%. All the laminates so produced blistered after boiling for 48 hours.

COMPARATIVE EXAMPLE 11

Example 1 was repeated in all details in a series except that a polyvinyl fluoride film comparable to that used in Example 1 but with no UV screening agent, was used. Seven out of eight different laminates did not pass the 100-hour boil test, whereas eight out of eight controls using the film with the polymeric UV absorber of Example 1 did pass.

EXAMPLE 12

Example 1 is repeated in all details except that the polyvinyl fluoride film contained 3% of a polymer of 2-hydroxy-4-allyloxy benzophenone in the place of the 5% of a polymer of 2-hydroxy-4-acryloxyethoxy benzophenone. The laminate thus produced was placed in boiling water and after 200 hours showed no deterioration, blistering, cracking or crazing.

EXAMPLE 13

Example 12 is repeated in all essential details except that the polyvinyl fluoride film contained about 4% of a polymer of 2-hydroxy-4-(2-methacryloxy ethoxy) benzophenone in the place of the polymer of 2-hydroxy-4-allyloxy benzophenone.

EXAMPLE 14

Example 13 is repeated in all essential details except that in the place of the polyvinyl fluoride film containing the polymer of 2-hydroxy-4-(2-methacryloxyethoxy) benzophenone there is substituted a polyvinyl fluoride film containing about 4% of a polymer of 2,4-dihydroxy-3-allyl benzophenone.

EXAMPLE 15

Example 1 is repeated in all essential details except that in the place of the polyvinyl fluoride film containing the polymer of 2-hydroxy-4-acryloxy ethoxy benzophenone there is substituted a polyvinyl fluoride film containing about 5% of a polymer of 2-hydroxy-4-methacryloxy benzophenone. When subjected to the boil test the laminate displayed no deterioration, no blistering, cracking, crazing, and in fact, no ill effects whatever even after 200 hours in the boiling water.

We claim:

1. A decorative laminate comprising a heat and pressure consolidated assembly of a rigidity imparting base member, a clear, transparent, substantially pigment-free film covering the surface of the decorative side of the laminate in which said film is a homogeneous blend of polyvinyl fluoride containing uniformly dispersed therein from about 0.1% to about 10% by weight of a polymer derived from a polymerizable 2-hydroxybenzophenone containing a polymerizable ethylenically unsaturated group wherein said film is bonded to the remaining layers of the laminate through an alpha cellulose paper layer impregnated with from about 60% to about 70% by weight of a thermosetting melamine formaldehyde resin having a mol ratio between about 1:1.5 and 1:2.5 melamine to formaldehyde respectively, wherein said melamine formaldehyde resin is converted to the thermoset state during the heat and pressure consolidation.

2. A decorative laminate according to claim 1 in which said benzophenone polymer is present in the film in an amount varying between 1% and 5% by weight based on the total weight of said film.

3. A decorative laminate according to claim 1 in which the alpha cellulose paper layer is a decorative sheet.

4. A decorative laminate according to claim 2 in which said benzophenone polymer is present in the film in an amount varying between 1% and 5% by weight based on the total weight of said film.

5. A decorative laminate according to claim 1 in which a decorative sheet containing from about 40% to 50% of a thermosetting melamine formaldehyde resin is positioned immediately below said alpha cellulose paper sheet.

6. A decorative laminate according to claim 5 in which said benzophenone polymer is present in the film in an amount varying between 1% and 5% by weight based on the total weight of said film.

References Cited

UNITED STATES PATENTS

| | | | |
|---|---|---|---|
| 3,403,071 | 9/1968 | Perry et al. | 161—258 |
| 3,421,973 | 1/1969 | Kamal | 161—189 |
| 2,694,028 | 11/1954 | Rapp | 161—258 X |
| 2,801,198 | 7/1957 | Morris et al. | 161—263 X |
| 3,194,719 | 7/1965 | Larkin et al. | 161—413 X |
| 3,215,665 | 11/1965 | Sharetts et al. | 260—45.95 |
| 3,228,823 | 1/1966 | Usala et al. | 161—189 X |
| 3,365,421 | 1/1968 | Horton et al. | 260—47 UA |
| 3,470,134 | 9/1969 | Ungar | 161—263 X |
| 3,475,248 | 10/1969 | Brasure | 161—189 X |
| 3,677,876 | 7/1972 | Oliver | 161—413 X |

HAROLD ANSHER, Primary Examiner

U.S. Cl. X.R.

161—189, 258, 263, 413